Aug. 17, 1937.     C. H. FOLMSBEE     2,090,514
TANK GAUGING DEVICE
Filed Oct. 26, 1934     3 Sheets-Sheet 3
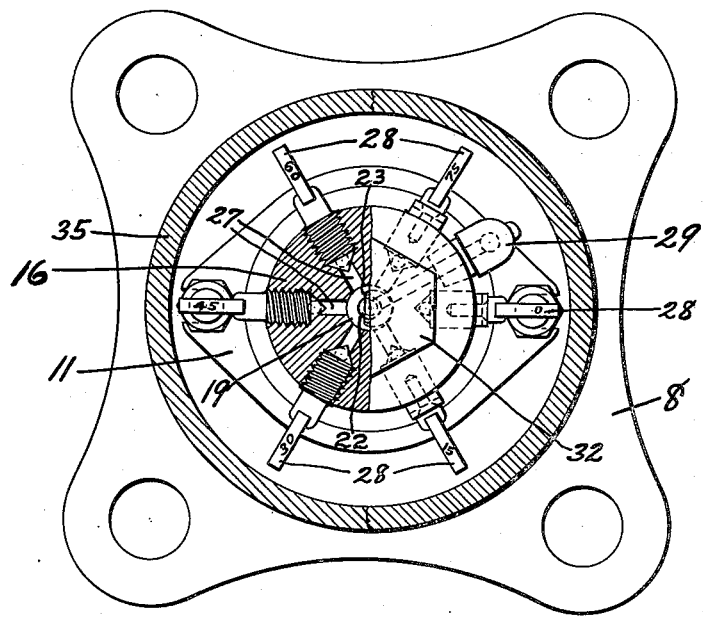
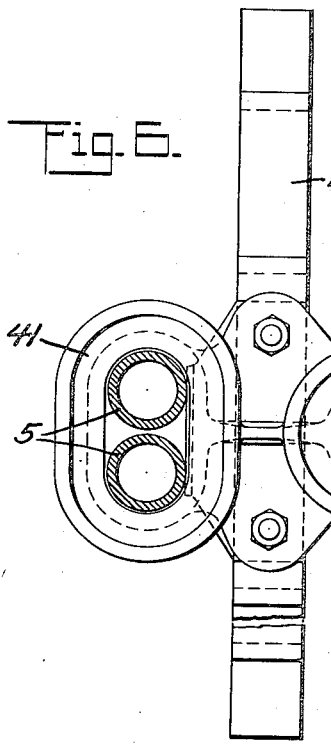
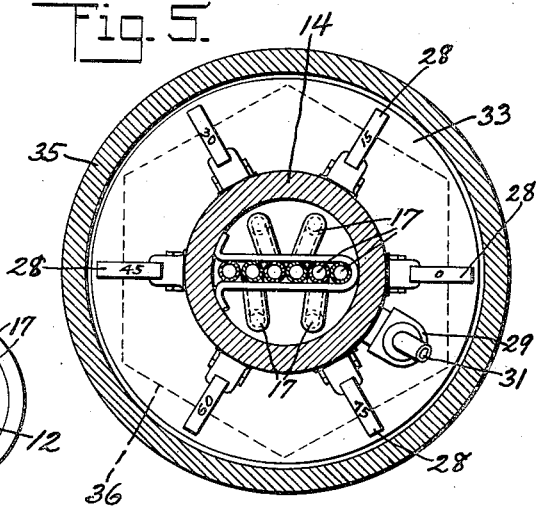
INVENTOR
Clyde H. Folmsbee
BY Donald U. Rich
ATTORNEY Patented Aug. 17, 1937

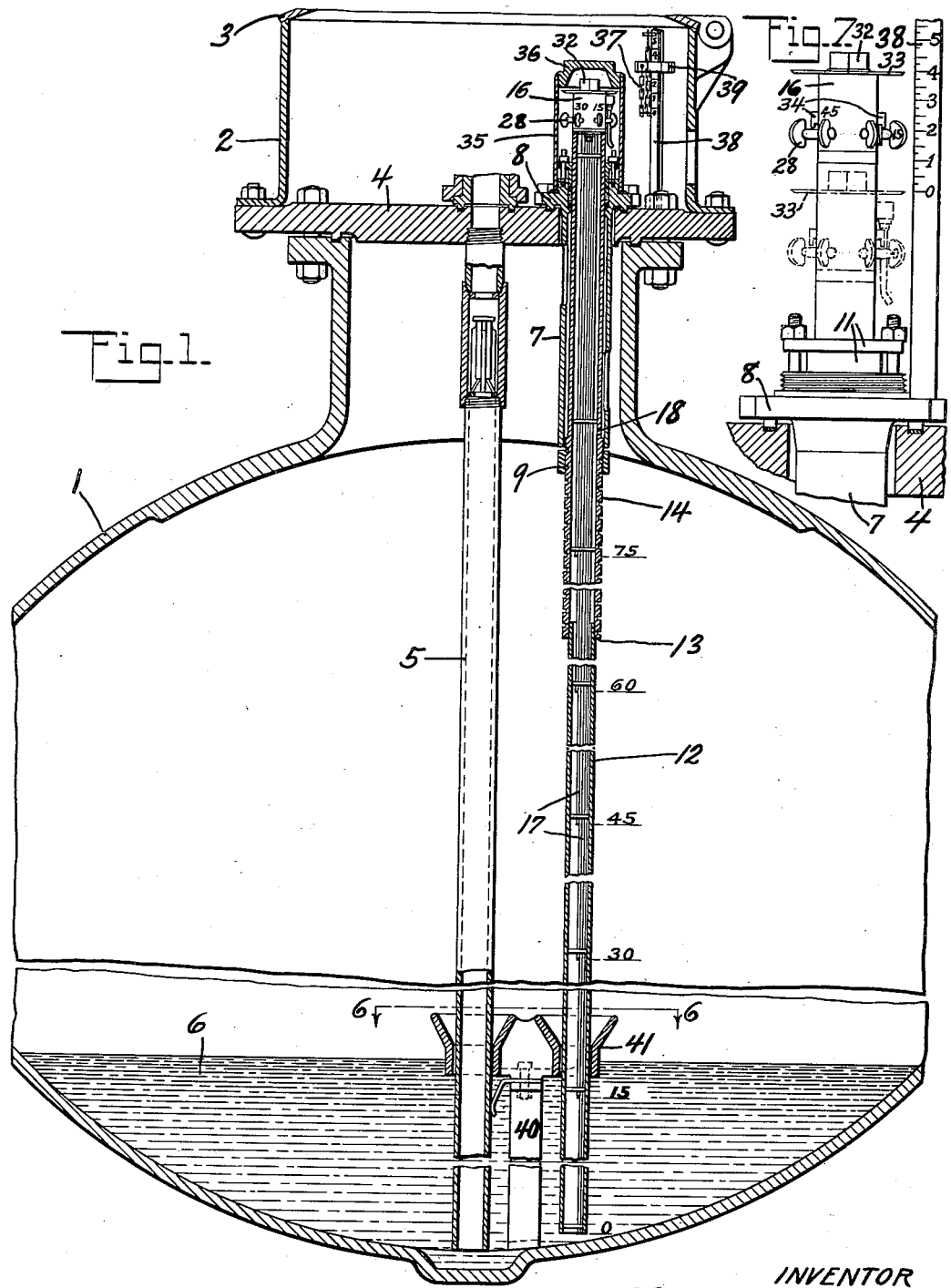

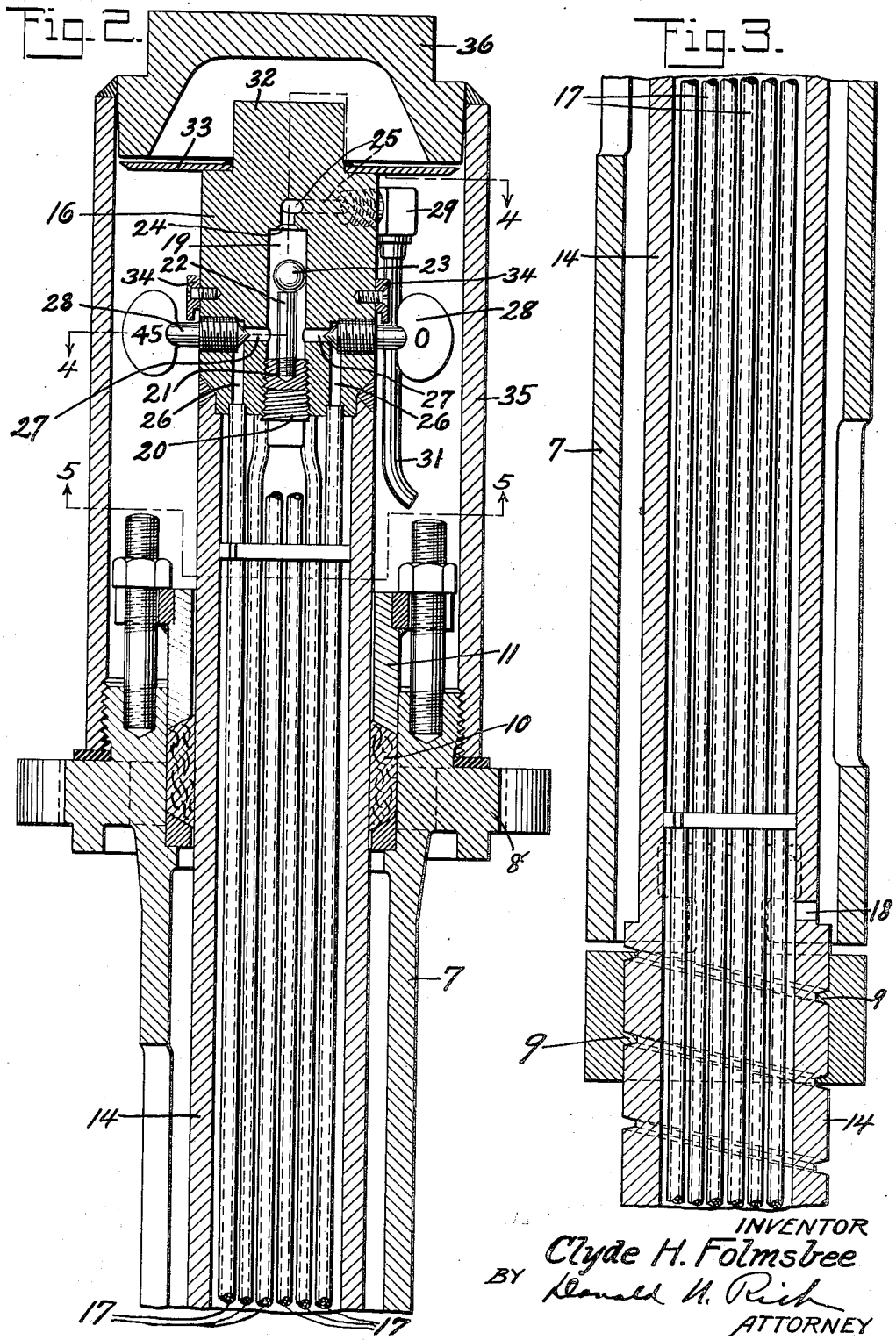

2,090,514

UNITED STATES PATENT OFFICE 2,090,514

TANK GAUGING DEVICE

Clyde H. Folmsbee, Berwick, Pa., assignor to American Car and Foundry Company, New York, N. Y., a corporation of New Jersey Application October 26, 1934, Serial No. 750,144

14 Claims. (Cl. 73—298)

This invention relates to improvements in measuring or gauging devices used for measuring the quantity of fluids in vessels which are under super-atmospheric pressure such as tanks and the like.

Previous gauging devices have been bulky, awkward, and hard to operate due to the extended motion necessary in their operation. Sliding, graduated tubes as previously used were hard to operate and the graduations scored and removed the packing so that it was almost impossible to keep the tube properly packed.

It is an object of the present invention to provide a device in which sliding, graduated rods are eliminated and a properly packed joint is easily maintained.

A further object is the provision of a measuring device having a number of tubes of various lengths that may be moved as a unit to obtain exactly the liquid level.

A still further object is the provision of a gauging device having a number of different length tubes each having individual valve control.

Still further objects will be apparent to one skilled in the art from a consideration of the following description taken in connection with the drawings, in which:

Figure 1 is a cross section view of a tank showing the device applied thereto;

Figs. 2 and 3 are detail enlarged sectional views of upper adjoining portions of the device;

Figs. 4 and 5 are sectional views taken on lines 4—4 and 5—5 of Fig. 2, looking in the direction indicated;

Fig. 6 is a section taken on line 6—6 of Fig. 1 showing the bottom steadying means for the pipes, and Fig. 7 is a diagrammatic showing of the device in use.

Referring now to the drawings in which similar characters indicate corresponding parts, the device is shown applied to a car tank 1 having the usual dome 2 and cover 3 housing and supporting the device. Suspended from the tank, and more particularly from the manhole cover 4 thereof, is a pipe 5 provided with suitable connections to permit the charging or discharging of fluids. It is readily seen that whether the tank cargo 6 is being charged or discharged through the pipe 5 super-atmospheric conditions will exist within the closed tank, and advantage is taken of this fact to provide a simple device to determine the exact liquid level.

The gauging device is supported by means of a short tubular connection 7 having a flanged collar 8 bolted or otherwise attached to the tank lid and provided adjacent its lower end with internal threads 9. The upper end of the tubular connection has an enlarged bore to receive packing 10 clamped down by ring 11 in the usual manner, to provide an air tight seal with the gauge device.

The gauge device consists of a lower pipe 12, joined at 13 to an upper pipe 14 having its lower portion threaded to engage the internal threads 9 of the tubular connection and provided at its upper portion with a control head 16 welded in place. A plurality of tubes 17 varying in lengths by a predetermined amount, are mounted within the pipes and clamped thereto at intervals and attached at their top ends to the control head. The pipes 12 and 14 being sealed at the upper end it becomes necessary to provide a vent 18 to insure that the liquid within and without the pipe will remain at the same level.

The control head is provided with a central, axial extending, bore 19 threaded at the lower end to receive a plug 20 threaded at 21 to receive a support 22 above which is placed a ball 23 adapted to rise under abnormal conditions against the seat 24 to seal the passage 25. Surrounding the bore 19 are a plurality of smaller, axially extending, bores 26 each adapted to receive a gauge tube. The control head is further provided with a plurality of radially extending passages 27, each intersecting the upper end of a bore 26 and extending into the bore 19, and having the outer end enlarged and threaded to receive the valve and stem 28 which controls the connection between passage 27 and bore 26. Threaded into the passage 25 of the head is a connection 29 provided with a discharge pipe 31, while immediately above the connection the head is provided with a hexagonal end 32 and shoulder supporting the disk 33 welded thereto.

The head may be tapped and threaded to receive numbered indicator plates 34, one for each valve stem, which also form stops to prevent valves 28 being unscrewed too far and lost, or the valve stems may be numbered directly as shown to indicate the respective passage and pipe which they control. The plates 34 may be and in practice are formed as a ring which is slid over the top of the head and fastened in place.

The tubular connection 7 is provided at its upper end with threads to receive a cap, formed of a tube 35 and a hexagonal headed plug 36 welded together, which when screwed down in place will effectively seal and protect the gauging device. Attached to the tank dome adjacent the gauge device is a chain 37 fastened to a measuring stick 38 held in place during transport by a bracket 39.

Mounted upon the bottom of the tank by means of a bracket 40 is a steadying device 41 provided with inclined upper surfaces adapted to guide the lower end of pipes 5 and 12 during assembly.

The operation of the device is as follows: Assuming the liquid to be under super-atmospheric conditions and the cap 35 removed; the valves in the control head are successively opened until the adjoining valves are discovered, one of which allows vapor to escape, and the other of which allows liquid to escape, in the illustration this would be valves marked 15 and 30, (see Fig. 1). The entire assembly is then turned by a wrench applied to the hexagonal head 32, and the entire tube and head assembly is lifted by the threads 9. During this turning and lifting the valve which discharged liquid is left slightly open, or frequently tested, and as soon as vapor is discharged it indicates that the lower end of the tube is at the liquid level, and the ruler 38 is then applied as shown in Fig. 7 and the amount the plate 33 has been lifted noted and added to the number stamped on, or indicated adjacent, the valve operated in determining the liquid level. In this way the exact depth of the liquid is given if the scale and valves are calibrated by linear standards, inches as shown, or the scales and valves may be calibrated by some other standard such as volume.

The ball check 23 is provided simply as a safety means to prevent too rapid discharge of material from the tank or vessel and in no way affects the normal gauging operation.

Although the device has been illustrated and described as applied to, and used on, a closed tank or vessel wherein superatmospheric pressure may be maintained, it is obvious that the device may be applied and used on any vessel wherein superatmospheric pressure cannot be maintained by simply inserting the device through the bottom instead of through the top. Various other changes in the application, use and structure of the device may be made without departing from the spirit of the invention or the scope of the following claims.

What is claimed is:

1. A gauging device for containers, comprising a plurality of projecting varying length tubes through which matter may flow and adapted to be mounted in a container, said tubes being reciprocable as a group by a distance at least equal to the greatest difference in length of the tubes whereby the projection of the tubes may be reduced during gauging, a head supporting said tubes and into which the latter discharge, and a plurality of valves in said head controlling the passage of the matter through the tubes.

2. A gauging device for containers, comprising a plurality of projecting varying length tubes clustered together and through which matter may flow adapted to be mounted in a container, said tube cluster being reciprocable as a group an amount equal to the difference in length of the tubes whereby projection of the tube cluster may be reduced, a common discharge means, and a plurality of valves clustered together in said discharge means, each valve associated with a tube to control the flow of the matter to the common discharge means.

3. A gauging device for vessels containing matter comprising in combination, a vertically adjustable pipe, a head on said pipe, a plurality of varying length tubes within said pipe and connected to said head thereby permitting adjustment of the tubes as a group, and a plurality of valves in said head controlling the flow of matter through the tubes.

4. A gauging device for containers of matter comprising in combination, a vertically adjustable pipe, a head on said pipe, a plurality of varying length tubes within said pipe and connected to said head thereby permitting adjustment of the tubes as a group, a plurality of valves in said head, each valve associated with a single tube for controlling the flow of matter through the respective tube.

5. A gauging device for containers of matter comprising in combination, a vertically adjustable pipe, a head attached to said pipe and provided with a plurality of passages and a discharge port, a plurality of varying length tubes within said pipe each connected to a passage and a plurality of valves in said head for controlling the flow of matter through the tubes and passages to the discharge port.

6. A gauging device for containers of matter comprising in combination, a tubular member, a rotatable pipe member within said tubular member, means associated with each member whereby upon relative rotation of the members the pipe member is vertically adjusted, a head on said pipe member, a plurality of varying length tubes clamped within said pipe member and connected to the head, and a plurality of valves in said head for controlling the flow of matter through the tubes.

7. A gauging device for containers of matter comprising in combination, a rotatable pipe member having a head portion attached thereto, a plurality of varying length tubes supported within said pipe member and connected to said head, a plurality of valves in said head, each valve associated with a single tube for controlling the flow of matter through the respective tube, a supporting member, and means associated with said pipe member and support member whereby relative rotation of said members will cause vertical adjustment of said pipe member.

8. A gauging device for containers of matter comprising in combination, a rotatable pipe member having a head portion attached thereto and provided with a plurality of passages and a discharge port, a plurality of varying length tubes supported within said pipe member, each tube being connected to a passage, a plurality of valves in said head, each valve associated with a single tube and passage for controlling the flow of matter through the respective tube and passage to the discharge port, a supporting member, and means associated with said pipe member and support member whereby relative rotation of said member will cause vertical adjustment of said pipe member.

9. A gauging device for containers of matter comprising in combination, a rotatable pipe member having a head portion attached thereto, a plurality of varying length tubes, supported within said pipe member and connected to said head, a plurality of valves in said head, each valve associated with a single tube for controlling the flow of matter through the respective tube, a supporting member, means associated with said pipe member and support member whereby relative rotation of said members will cause vertical adjustment of said pipe member, and sealing means associated with said members to prevent the escape of matter between the members.

10. A control head for a gauging device comprising, a substantially centrally located axial bore, a plurality of axial passages adjacent said bore, a plurality of radial passages intersecting the axial passages and bore, a plurality of valves, one valve in each radial passage for controlling the passage of matter between the respective axial passage and the bore, a radial bore intersecting said axial bore, and a ball check within said axial bore operative to prevent excessive discharge of matter through said radial bore.

11. A gauging device for vessels containing matter comprising in combination, a vertically adjustable pipe, a head on said pipe, a plurality of varying length tubes within said pipe and connected to said head thereby permitting adjustment of the tubes as a group, and valve means in said head for selectively controlling the flow of matter through the tubes.

12. A control head unit for gauging devices comprising a block having formed therein, a substantially centrally located axial bore, a discharge passage communicating with the bore, a valve adapted to close said passage, a plurality of axial passages within the block and adjacent said bore, a plurality of substantially radial passages intersecting and connecting the axial passages and central bore within the block, and valve means for controlling the passage of matter between the respective axial passage and the central bore.

13. In a gauging device for containers holding liquid and gas, a pipe extending into the container with its outer end portion arranged outside the container and provided with a head, a plurality of valves in said head, and a plurality of varying length tubes assembled as a group and arranged within said pipe, said tubes being respectively connected to said valves whereby the level of the liquid within said container may be ascertained by the escape of liquid and of gas from the container through said valves.

14. In a gauging device for tanks holding liquid and gas, a unit comprising a plurality of tubes of varying length adapted to be arranged vertically in the tank with the upper end portions thereof outside the tank, a head to which the tubes are secured, and valves for said tubes arranged in the head whereby the level of the liquid in the tank may be ascertained by the escape of liquid and of gas from said valves, said unit being so arranged as to be adjustable in said tank.

CLYDE H. FOLMSBEE.